US011593109B2

(12) United States Patent
Levenstein et al.

(10) Patent No.: US 11,593,109 B2
(45) Date of Patent: Feb. 28, 2023

(54) SHARING INSTRUCTION CACHE LINES BETWEEN MULTIPLE THREADS

(71) Applicant: INTERNATIONAL BUSINESS MACHINES CORPORATION, Armonk, NY (US)

(72) Inventors: Sheldon Bernard Levenstein, Austin, TX (US); Nicholas R. Orzol, Austin, TX (US); Christian Gerhard Zoellin, Austin, TX (US); David Campbell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 17/341,209

(22) Filed: Jun. 7, 2021

(65) Prior Publication Data

US 2022/0391208 A1    Dec. 8, 2022

(51) Int. Cl.
*G06F 9/30* (2018.01)
*G06F 12/0875* (2016.01)
*G06F 9/32* (2018.01)

(52) U.S. Cl.
CPC ............ *G06F 9/30047* (2013.01); *G06F 9/32* (2013.01); *G06F 12/0875* (2013.01); *G06F 2212/1041* (2013.01)

(58) Field of Classification Search
CPC .... G06F 9/30047; G06F 9/32; G06F 9/44563; G06F 9/3808; G06F 9/3851;
(Continued)

(56) References Cited

U.S. PATENT DOCUMENTS 4,442,487 A    4/1984  Fletcher
6,161,166 A *  12/2000  Doing ................. G06F 12/1036
                                           711/E12.063
(Continued)

FOREIGN PATENT DOCUMENTS

EP       3757801 A1     12/2020

OTHER PUBLICATIONS

M. E. Acacio, J. Gonzalez, J. M. Garcia and J. Duato, "A. novel approach to reduce L2 miss latency in shared-memory multiprocessors," Proceedings 16th International Parallel and Distributed Processing Symposium (Year: 2002).*

(Continued)

*Primary Examiner* — William B Partridge
*Assistant Examiner* — Kasim Alli
(74) *Attorney, Agent, or Firm* — Intelletek Law Group, PLLC; Gabriel Daniel, Esq.

(57) ABSTRACT

Aspects are provided for sharing instruction cache footprint between multiple threads using instruction cache set/way pointers and a tracking table. The tracking table is built up over time for shared pages, even when the instruction cache has no access to real addresses or translation information. A set/way pointer to an instruction cache line is derived from the system memory address associated with a first thread's instruction fetch. The set/way pointer is stored as a surrogate for the system memory address in both an instruction cache directory (IDIR) and a tracking table. Another set/way pointer to an instruction cache line is derived from the system memory address associated with a second thread's instruction fetch. A match is detected between the set/way pointer and the other set/way pointer. The instruction cache directory is updated to indicate that the instruction cache line is shared between multiple threads.

20 Claims, 5 Drawing Sheets

(58) Field of Classification Search
CPC .............. G06F 12/0806; G06F 12/084; G06F 12/0842; G06F 12/0875; G06F 2212/452; G06F 2212/655

See application file for complete search history.

(56) References Cited

U.S. PATENT DOCUMENTS

| | | | |
|---|---|---|---|
| 6,990,557 B2* | 1/2006 | Hokenek | G06F 12/0842 711/134 |
| 7,434,000 B1 | 10/2008 | Barreh | |
| 7,895,415 B2 | 2/2011 | Gonzalez et al. | |
| 8,417,915 B2 | 4/2013 | Gilday et al. | |
| 8,949,572 B2 | 2/2015 | Kurosawa et al. | |
| 9,514,044 B2* | 12/2016 | Chang | G06F 12/0811 |
| 10,163,510 B1 | 12/2018 | Giles et al. | |
| 10,534,616 B2 | 1/2020 | Gonzalez et al. | |
| 10,901,627 B1 | 1/2021 | Bshara et al. | |
| 2002/0095614 A1 | 7/2002 | Rodgers et al. | |
| 2003/0182512 A1* | 9/2003 | Hammarlund | G06F 12/0842 711/E12.039 |
| 2004/0215882 A1* | 10/2004 | Alexander | G06F 12/0864 711/E12.063 |
| 2004/0268093 A1 | 12/2004 | Samra et al. | |
| 2006/0184741 A1 | 8/2006 | Hrusecky | |
| 2014/0181484 A1 | 6/2014 | Callister et al. | |
| 2015/0095588 A1 | 4/2015 | Abdallah | |
| 2015/0312116 A1 | 10/2015 | Taheri et al. | |
| 2016/0019168 A1 | 1/2016 | Rychlik | |
| 2017/0091117 A1* | 3/2017 | Cain, III | G06F 12/0842 |
| 2020/0409711 A1 | 12/2020 | Constable et al. | |

OTHER PUBLICATIONS

List of IBM Patents or Patent Applications Treated as Related, 2 Pgs.

Subramaniam, S. et al., "Fire-and-Forget: Load/Store Scheduling with No Store Queue at All"; In the proceedings of the 39th International Symposium on Microarchitecture, Dec. 2006, 12 pgs.

Disclosed Anonymously, "Multiple Absolute Address History Tables Combined with BranchTarget Buffer (BTB) Absolute Address Prediction"; Ip.com; IPCOM000206764D, May 5, 2011; 4 pgs.

Disclosed Anonymously, "Value Prediction Implementation"; Ip.com; IPCOM000263479D, Sep. 3, 2020; 5 pgs.

Mittal, S., "A Survey of Recent Prefetching Techniques for Processor Caches"; ACM Computing Surveys (2016); 37 pgs.

Blelloch, G. E et al., "Effectively Sharing a Cache Among Threads"; SPAA (2004); Barcelona, Spain; 10 pgs.

Piersma, R., "The Practicality of Cache-Based Side Channel Attacks"; Senior Thesis, Grand Rapids Scholars Program, 22 pgs.

International Search Report and Written Opinion dated Jul. 28, 2022 in related international patent application No. PCT/IB2022/055108; 9 pgs.

* cited by examiner

SHARING INSTRUCTION CACHE LINES BETWEEN MULTIPLE THREADS

BACKGROUND

Technical Field

The present disclosure generally relates to memory cache, and more particularly, to systems and methods of sharing instruction cache footprint between multiple processor threads.

Description of the Related Art

Cache memory (or "cache") is a supplementary memory system that temporarily stores frequently used instructions and data for quicker processing by the central processor of a computer. The cache augments, and is an extension of, a computer's main memory. Cache typically holds a copy of more recent and frequently used information or program codes stored in the main memory. Cache typical operates faster than system memory reducing the time required to locate and provide cached data or instructions to the central processor.

In a multi-threaded processing environment, there is typically no way to determine which instruction cache lines (or ways within a set) are shareable across process boundaries. Further, instruction cache lines (or ways within a set) are normally marked private per thread. Thus, instruction cache footprint typically cannot be shared between different processor threads of a multi-threaded processor environment.

SUMMARY

According to various embodiments of the present disclosure, a computing device, a non-transitory computer readable storage medium, and a method are provided for sharing instruction cache footprint between multiple threads.

Aspects of the present disclosure include sharing an instruction cache footprint across multiple threads of a multi-thread processor using instruction cache (e.g., L2) set/way pointers and a tracking table. The tracking table saves potential candidates, even when the instruction cache has no access to real addresses or translation information.

An instruction fetch requesting an instruction from a system memory address is received from a first thread. The instruction is fetched from the system memory address. A set/way pointer to an instruction cache line is derived from the system memory address. The instruction is cached in the instruction cache line. The set/way pointer is stored as a surrogate for the system memory address in an instruction cache directory (IDIR).

Another instruction fetch requesting another instruction from another system memory address is received from a second thread. In association with requesting the other instruction, it is determined that the other system memory address is a candidate for possible sharing. The set/way pointer previously stored in the instruction cache directory is saved in a tracking table. Another set/way pointer to another instruction cache line is derived from the other system memory address. The set/way pointer is accessed from the tracking table. If it is detected that the set/way pointer and the other set/way pointer both point to the instruction cache line, then the instruction cache directory is updated to indicate that the instruction cache line is shared between multiple threads.

The instruction cache line can then be returned to either the first thread or the second thread in response to subsequent instruction fetches for the instruction from the first thread or from the second thread.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
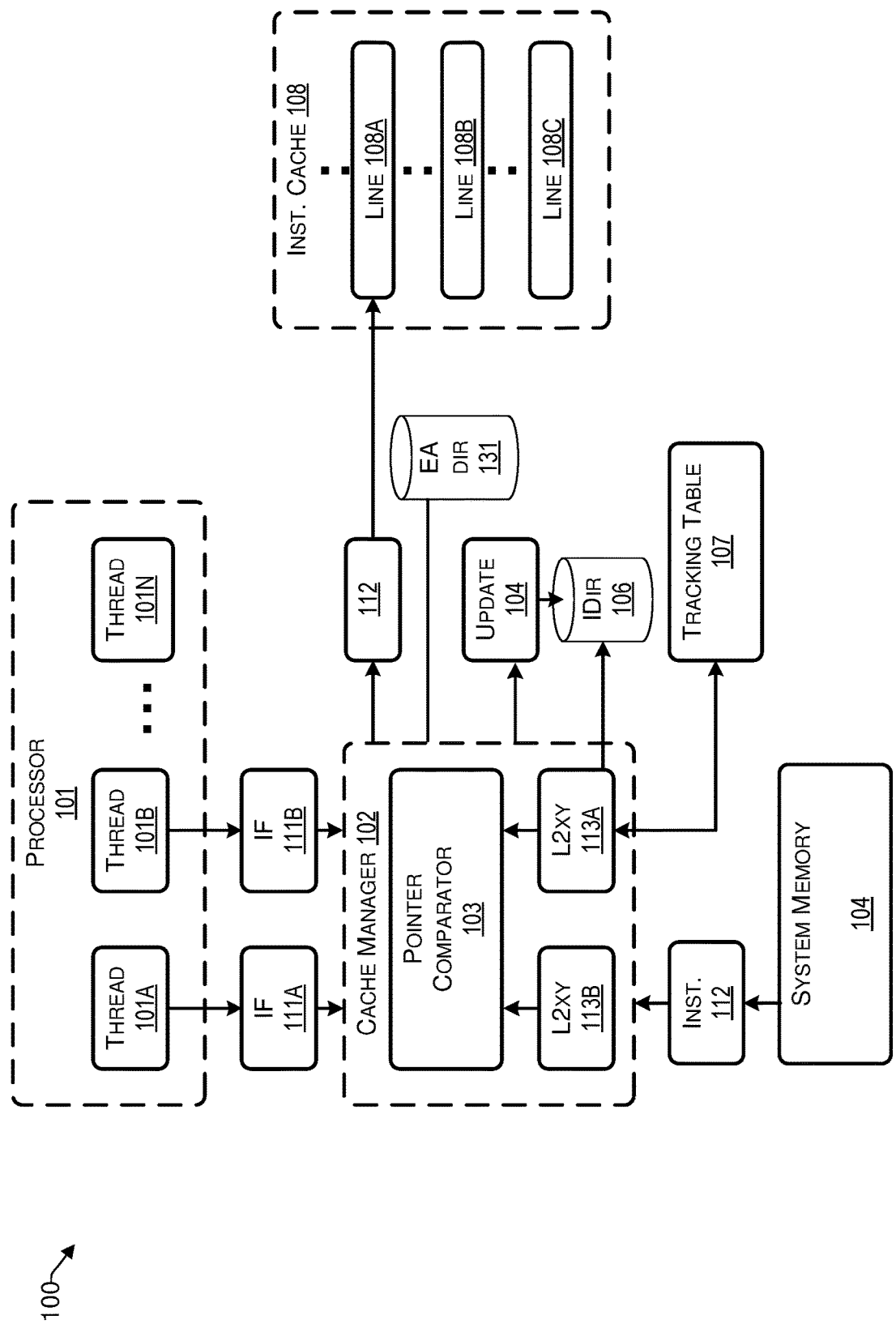
FIG. 1 illustrates an example computer architecture that facilitates sharing instruction cache footprint between multiple threads, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to computing devices, non-transitory computer readable storage mediums, and methods of sharing instruction cache foot print between multiple threads. In one aspect, multiple (e.g., 4) threads take turns doing instruction fetches out of a common instruction cache (or "icache"). The number of threads is arbitrary, ranging, for example, from 2-N threads.

Aspects provide a way to determine when cache lines can be shared among the multiple threads. An instruction cache (e.g., L2) set/way pointer (hereinafter referred to as a "L2xy") can be stored in an icache directory and used as a surrogate/alternative for a corresponding real address. If the L2xy is the same for two fetches, then memory data for two icache misses is also the same. A tracking table can be utilized to find potential sharing candidates. The tracking table can be split by thread and can include one entry per thread. Each entry can include an effective address (EA), model-specific registers (MSRs) state, and an L2xy pointer. Aspects also include reload machines for each cache miss in flight and mechanisms to manage translation invalidates in an architectural sound manner.

An icache can be an effective address cache such that there is no concept of physical or real address, except for an L2xy pointer that stores a few bits of the real address along with an associativity pointer within the instruction cache (e.g., L2). Using L2xy pointers, instruction cache invalidates can be implemented when either: (1) there is a store modifying a cache line in the instruction cache or (2) the line is aged out of the L2. L2xy pointers can be compared across threads when an instruction cache line is invalidated and if data is returned for new threads with a matching L2xy pointer, an instruction cache line can be shared for multiple threads.

Thread specific context tags can be used to identify threads. The thread specific context tags can be statically mapped to hardware threads (e.g., ctxttag=tid+8). Thus, a tid can be derived from a context tag. A thread specific context tag can map a current thread or another thread that is not the current thread. An additional shared thread context tag can be used to indicate an icache line is shared. Thread specific context tags can be used to indicate which thread originally loaded an icache line when creating a tracking table entry. As such, it can be determined which thread can be architecturally shared when an L2xy pointer matches and when the reload returns from the instruction cache.

As such, an instruction fetch unit (IFU) can identify cache lines that have the same EA (i.e., L2xy pointer) and are allowed to hit the same instruction cache line. A tracking table is used to detect sharing and acquires an L2xy pointer of an incumbent thread when the instruction cache directory (IDIR) is read for corresponding IDIR miss. Sharing can be remembered via a special context tag value (e.g., 0xF or 1111).

The tracking table can include instruction cache directory (IDIR) information related to a recent "almost miss". An almost miss can occur when an there is an IDIR miss but everything else matched except for the context tag.

In general, whenever there is an instruction cache effective address directory (EADIR)/IDIR miss, an entry can be written to the tracking table when various conditions are satisfied, such as, for example:
1. The EA and MSR match.
2. The IEADIR hit and way select was correct if used.
3. The sector valid is valid
4. There is no extraneous force miss condition.
5. The incumbent IDIR entry's context tag is a thread specific context tag or special (e.g., 0xF) context tag
6. The fetch's context tag is a thread specific context tag.
7. The thread valid from the IDIR does not include the current thread. The thread valids saved in the tracking table depend on whether or not the IDIR entry's context tag was already the special (e.g., 0xF) context tag, or was a thread specific context tag.
    a. If the incumbent IDIR entry's context tag is the special (e.g., 0xF) context tag, then the thread valid saved is the current IDIR thread valid "OR"-ed with the current thread.
    b. If the context tag is a thread specific context tag of (e.g., 8, 9, A, B) then the thread valid is the "OR" of the decode of the context tag bits (2:3) with the current thread.

When conditions match, it should imply that everything matched except for the context tag and is considered an "almost hit". Installing a new Tracking Table entry can include overwriting an existing entry. The Tracking Table is installed with the information above, saved from the IDIR and the EADIR, along with the IDIR thread valids as described.

Based on a tracking table lookup, the IDIR and reload machines are modified from a thread specific context tag to a shared thread context tag. Various fields of a reload machine can be modified when L2xy, EA, and MSR of an instruction cache (e.g., L2) return match the tracking table. For example, a context tag can be modified to, for example, 0xF, to indicate sharing. Thread valids from IDIR can be modified to include the matching. An instruction reload unit (Iru) was of lower level (e.g., L1) instruction cache can be modified to reflect original miss in the tracking tables. This modification helps ensure that the new line does not take up additional space in the instruction cache.

If a shared thread context tag of, for example, 0xF, matches the EA and msr and the directory shared_thread bit is active, it is considered an instruction cache hit.

A set timing for comparing the tracking table as data is returned from a cache to update the reload machine, which in turn can write the icache directory entry shared instead of private. A similar timing chain can be used for cache invalidates, along with invalidate window checking. The cache returns the L2xy one cycle before the cache data returns, and the cache also returns the L2xy for invalidates in a consistent manner on the same interface. A tracking table can be implemented in the cycle that the L2xy becomes available for the tracking table lookup.

The tracking table can be automatically invalidated when a line is modified for cache data return, or a cache kill. The cache kill sequence can implement a read-modify-write lookup of the IDIR designed for architectural compliance. The tracking table must also compare cache kills in flight in the event that there was a cache miss returned from beyond the cache that is redefining the line with the unique L2xy of the tracking table for the new line In one aspect, the IDIR is accessed for the particular way which had an EADIR hit, and the IDIR is not accessed when there is an EADIR miss. The cache demand request may only be sent when there is an EADIR miss. This saves power, but utilizes asynchronous tracking table entry creation to the demand request An EADIR thread sharing mask can implement greedy sharing, so that the thread sharing mask in the EADIR usually has all bits active unless multiple misses have the same EA value. When two different threads are using the same EA values for different icache lines, then the two copies likely have the thread valid for the other thread inactive so they can both hit in the EADIR on their own thread's icache data.

EADIR thread valids can be invalidated when there is an ieadir hit on the EA, and the thread bit is currently on, but the full icache directory caused a cache miss due to one of the other fields that is usually thread specific like the MSR, or the context tag. If the context tag is one for which the implementation wants to share across processes, then this EADIR invalidate also creates a tracking table entry saving the current icache directory.

The tracking table can be asynchronous from the reload machine and L2 demand request. As such, implementations can compare the EA and MSR for the current thread's tracking table entry when data returning from the cache to see if the current return matches. Comparing EA and MSR for a tracking table entry facilitates transparently handling flushes and other branch redirects that might delay the cache demand request for an arbitrarily long time after the tracking table is created. This improves performance, facilitating redirection away after creating a tracking table entry, before the request is sent. It may be that the tracking table icache line does become a demand or prefetch request at some future time, and when that demand or prefetch is returned from the cache, it is determined that it matched the tracking table entry.

In an alternative approach, there may be a cache demand request cache miss that occurs due to the context tag, or the thread sharing mask in a modified context tag, but other directory fields match. When the cache demand request is sent, tracking table entry is created to track that cache demand request reload machine. This approach utilizes the fact that all ways of an IDIR can be read for every access including an access with a demand request.

Accordingly, the present disclosure provides a way to determine when cache lines can be shared among multiple threads. Without the present teachings, the effective icache size per thread is 1/N of the total icache, where N is the number of threads. In one aspect, multiple threads (e.g., four threads) can share the entire icache footprint, which vastly improves performance for symmetrical multiprocessing.

To better understand the features of the present disclosure, it may be helpful to discuss example architectures. To that end, FIG. 1 illustrates an example computer architecture 100 that facilitates sharing instruction cache footprint between multiple threads.

Example Architecture

Reference now is made to FIG. 1, which is an example computer architecture 100 that facilitates sharing instruction cache footprint between multiple threads, consistent with an illustrative embodiment. Architecture 100 includes multi-threaded processor 101, cache manager 102, system memory 104, IDir 106, tracking table 107, instruction cache 108, and EA dir 131. As further depicted, multi-threaded processor 101 includes threads 101A, 101B, . . . , 101N. In one aspect, processor 101 includes four (4) threads.

Cache manager 102 can implement, include, and/or inter-operate with various other components of a memory management system including, but not limited to: a memory management unit (e.g., configured to translate between real addresses and EAs), one or more reload machines, cache control and data flow components, cache predecode components, instruction cache write data flow components, instruction decode components, buffers, issue components, execution components, load/store components, instruction fetch address registers, instruction fetch components, branch prediction components, instruction sequence components, etc.

Instruction cache 108 can be an N-way associative cache including M sets, wherein N is number between two (2) and twelve (12) and M is a number between 4 and 128. In one aspect, instruction cache 108 includes 64 sets of 6 ways.

In one more particular aspect, instruction cache 108 is the first level (e.g., L1) in a memory hierarchy that is accessed when fetching instructions. Instruction cache 108 can store PPC bits of the instructions as well as the pre-decode/branch recode bits associated with each one. Instruction cache 108 can receive reload data from a second level (e.g., L2) interface. Output to the second level cache is sent through a memory management unit (capable of translating real addresses (RAs) to EAs). Output to the second level cache also supplies instructions to decode, pre-decode/branch recode bits to the branch scan logic, and pre-decode bits to the decode and fusion logic.

Instruction cache 108 can include the following attributes:
48 kB; implemented as 8 macros details:
EA-indexed and EA-tagged
64 sets (index is EA[51:56])
tag is EA[0:50]
6-way associative using eadir EA indexed array to predict way select
128-byte cache line
4 32-byte sectors per cache line
1 read port and 1 write port:
Read up to 8 instructions at once
Write a sector at a time
12 macros, arranged 4 horizontal×3 vertical
8 R/W banks
pseudo-LRU eviction policy implemented using an MRU tree
Built with 6T-SRAM cells, dual-ended read and write Cache manager 102 can use EA Dir 131 to select which way of instruction cache 108 is accessed and provide an earlier indication of an instruction cache miss/hit. For example, EA Dir 131 can provide a one-hot 6-bit way select based on an EA compare and thread valid bits. Thread mask thread valid bits allow sharing between threads, by supporting valid entries for more than one thread at a time.

EA Dir 131 can include the following attributes:
64 sets of 6 ways
Set indexed by EA(51:56)
Physically 1 directory
1 read port, 1 write port
Read and write same cell not permitted, this conflict is detected outside the ICache
Write only on first ICache write
Each way compared with EA(39:50) and thread valid bits to generate way selects
Total: 64 sets×16 bits per way×6 ways
Bypass comes from outside instruction cache 108
10T-SRAM cell (optimized for speed)
Table 1 indicates examples EA Dir bit definitions:

TABLE 1

| Bit | Field | Description |
| --- | --- | --- |
| WAY0(0:15) | WAY0 | EA(39:50) \|\| ThreadMask(0:3) |
| WAY1(0:15) | WAY1 | EA(39:50) \|\| ThreadMask(0:3) |
| WAY2(0:15) | WAY2 | EA(39:50) \|\| ThreadMask(0:3) |
| WAY3(0:15) | WAY3 | EA(39:50) \|\| ThreadMask(0:3) |
| WAY4(0:15) | WAY4 | EA(39:50) \|\| ThreadMask(0:3) |
| WAY5(0:15) | WAY5 | EA(39:50) \|\| ThreadMask(0:3) |

IDir 106 can be the tag-store of instruction cache 108. IDir 106 can be used to do true instruction cache hit detection by doing a tag compare. In one aspect, IDir 106 also stores the valid bits, the parity bitsm MSR bits, page size bits, and bits for handling SLB/TLB invalidates.

IDir 106 can include the following attributes:
64 sets of 6 ways
Mirrors the ICache/EADir
Also indexed by EA(51:56)
6 growable regfiles
1 regfile for each way, so each regfile is 64 sets×84 bits
When sector valids are updated, the IDir 106 can be written 4 times per cache line (on every ICache sector write), unlike the EADir may be written once
Table 2 indicates examples of IDir bit definitions:

TABLE 2

| Bit | Field | Description |
| --- | --- | --- |
| 0:50 | TAG | The EA tag for this cache line, EA[0:50]. EA[51] can be an address bit for the IDir instead of a tag bit. |
| 51 | CLASS | Class bit |

TABLE 2-continued

| Bit | Field | Description |
|---|---|---|
| 52:58 | MSR | 52: MSR(TA), tags active<br>53: MSR(HV), hypervisor<br>54: MSR(PR), 1 if problem state, 0 if (privileged) state<br>55: MSR(LE), little endian<br>56: MSR(US), 1 if user state, 0 if system state (for TA)<br>57: MSR(S), secure bit<br>58: MSR(IR), instruction relocate |
| 59:62 | THREAD | Indicates which threads share this ICache entry. The thread valids are used for icache hit logic, and they are also for SLB invalidates.<br>(59, 60, 61, 62) = thread(t0, t1, t2, t3) |
| 63:65 | L2_CC_WAY | This is the L2 congruence class way that contains this L1 cache line. On an L2 reload and an L2 icbi/kill the L2 sends the congruence class on the l2_if_way(0:2)<br>63:65 l2_if_way(0:2) |
| 66:70 | L2_CC_RA | This is the L2 congruence class ra(47:51) that contains this L1 cache line. On an L2 reload and an L2 icbi/kill the L2 sends the congruence class on the l2_cr_rld_ra(47:51). Bit (47) is required for a 1meg L2 cache.<br>66:70 = L2_IF_CC_RA(47:51) |
| 71:72 | PAGE_SZ | Only bit (72) is implemented; support >4k page size |
| 73:76 | VALID | 1 sector valid for each of the 4 sectors in a cache line<br>(73, 74, 75, 76) = sector valid(0, 1, 2, 3) |
| 77:79 | PARITY | 3 parity bits per cache line, calculated by xor-ing every $3^{rd}$ bit of the data written into this entry.<br>(77) = parity(2, 5, 8, 11, 14, . . . 62, 65, 68, 71, 74) spare(80, 83)<br>(78) = parity(0, 3, 6, 9, 12, . . . 60, 63, 66, 69, 72, 75) spare(81)<br>(79) = parity(1, 4, 7, 10, 13, . . . 61, 64, 67, 70, 73, 76) spare(82) |
| 80:83 | CTAG | Context tag(0:3) for the current context. If future ICache directory enhancements require additional bits, this four bit field can be reduced in size to less than four bits to provide additional spare bits. |

As described, context tags (e.g., CTAG) can be used to per thread. In one aspect, (e.g., when there is 4 threads), a context tag can be a four (4) bit value including values 1000, 1001, 1010, 1011, 1111 can be used:

Ctxt tag=1000 tid0 private context tag for tid0's process
Ctxt tag=1001 tid1 private context tag for tid1's process
Ctxt tag=1010 tid2 private context tag for tid2's process
Ctxt tag=1011 tid3 private context tag for tid3's process
Ctxt tag=1111, modified context tag mmu context tag is shared for the threads indicating by the ICache directory thread bits.

The thread specific context tags can be used to indicate which thread originally loaded the icache line when creating a tracking table entry.

A thread value can be received from a memory management unit (MMU) and/or included in a context tag. For Ctxt tag=1111, the thread indicates which threads have been architecturally determined to share the page when the cache line was written.

A context table can contain pointers to the LPID & PID register. When a context table is searched it should not be possible to have a multi-hit for a given EA(0:1), LPCR (Radix), LPCR(UPRT), MSR(HV), and MSR(DR) bit. The two-bit pointers reference one of the LPIDR/PIDR registers, or in some cases both. When a thread has a match, their pointers point to the same set of registers, such that when the context table is searched, it is not possible for two tags to point to the same combination of LPID & PID.

Instruction cache 108 can utilize a binary tree pseudo Least Recently Used (LRU) replacement policy. In one aspect, two subtrees are three (3) way associative true LRU.

EA Dir 131 can store L thread sharing bits, wherein L is the number of threads (e.g., 4). EA Dir 131 can include a sharing makes for threads associated with an entry. IDir 106 can also utilize a sharing mask, that is sent to it by the MMU on an Icache/Idir write. On an invalidate, the sharing masks can indicate which other threads are to be invalidated if one thread invalidates a shared cache line (e.g., in instruction cache 108).

Various difference circumstances can be led to invalidating a shared cache line. Invalidate circumstances can include:
1) EADir hit, IDir miss: the EADir is detecting early hits falsely; since the IDir miss is received later, the way to invalidate can be determined. This invalidate scenario is also used to create a tracking table entry for the access.
2) EADir multihit: created by prefetches (the EADir may not be looked up on a prefetch, but IDir is). The prefetch can write the mask of the parent demand request (which it gets from the rldm) into the EADir; on this invalidate, a way to invalidate is randomly selected.
3) Conflict while writing a line: is there an L2 invalidate during L2 data return, on a collision the invalidate wins, so the sector being written is dropped, getting partial thread valids.
4) RLDM is reallocated to subsequent miss while data for initial request is being written to the icache, this can include a fast next miss and data return.

An EADir invalidate can be read-modify-write operation that occurs during specific instruction fetch (IF) stages. In an earlier IF stage, cache manager 102 can read EA Dir 131. At this earlier IF stage, EA (e.g., EA[49:56]) and the thread mask is known. The EA and thread mask are carried to a later IF stage when an invalidate latch is available. Cache manager 102 can write to EA Dir 131 at this later IF stage with the thread mask with the bit for thread being invalidated zeroed out.

If there is an EADir write in an intermediate IF stage (e.g., between the earlier and later IF stages), or if there is an ICache write conflict in the later IF stage, invalidation can be delayed and IFAR awoken once the operation reaches the late IF stave. Such invalidation behavior errs on the side of caution. The next time EA Dir 131/Icache 108 is accessed, the invalidate circumstance can be redetected and another invalidation attempt performed.

EA Dir 131 can have an "almost hit". If an instruction EA matches in EA Dir 131, the EA Dir entry is invalid for the accessing thread, but valid for another thread. The match can be latched up after the EA Dir access and the thread mask saved in reload machine for the subsequent Icache miss. Out of the EADir, thread valids(0:3) and an almost way(0:3) can be determined for each of the 6 ways.

Tracking table 107 can store IDIR information related to a recent "almost miss". As described, an "almost miss" can occur when where here is an IDIR miss but everything matched except the context tag. Tracking table 107 can correlate entries in IDir 106 with reloads that can potentially share threads across an IDIR entry. Allocation and use of tracking table 107 can be used for threads with a thread specific context tag. An incumbent as well as a fetching thread can both correspond to thread specific tags.

Table 3 indicates examples tracking table entry attributes:

TABLE 3

| Field | Size (bits) | Description |
| --- | --- | --- |
| Valid | 1 | Indicates whether this entry is valid or not. |
| EA(0:56) | 57 | Cache line that installed this entry. |
| IDIR Way | 3 | Which IDIR way was read to create this entry. |
| MSR[TA, HV, PR, LE, US, S, IR] | 7 | MSR bits that are also stored in the IDIR. |
| Class | 1 | |
| Page | 1 | |
| L2xy | 8 | L2_if_way(0:2) & l2_if_rld_ra(47:51); 12 way and congruence class of the IDIR entry that created this entry. |
| Thread 0-3 Valid | 4 (1 per tid) | valid bits are described below, "or" ed with the allocating thread. |
| EADir thread valid | 4 (1 per tid) | Copied from eadir |
| Spare | 4 | Spare bits for ECOs. |

Tacking table 107 can be split by thread and include one entry per thread. Tracking table 107 can be used independently as a cache line-granular sharing mechanism.

Figure 2:
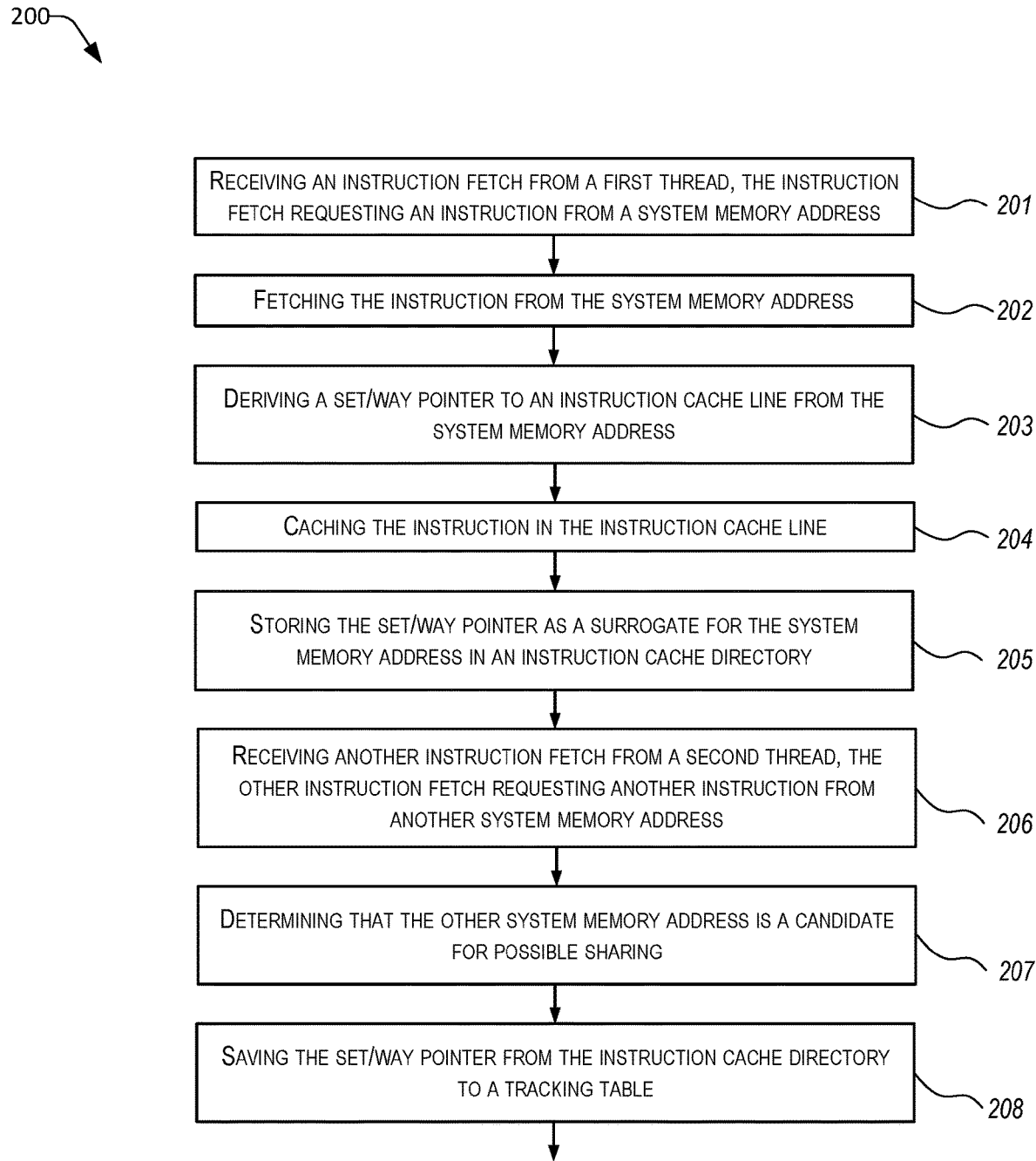
FIG. 2 illustrates a flow chart of an example method for sharing instruction cache footprint between multiple threads, consistent with an illustrative embodiment.
Figure 2:
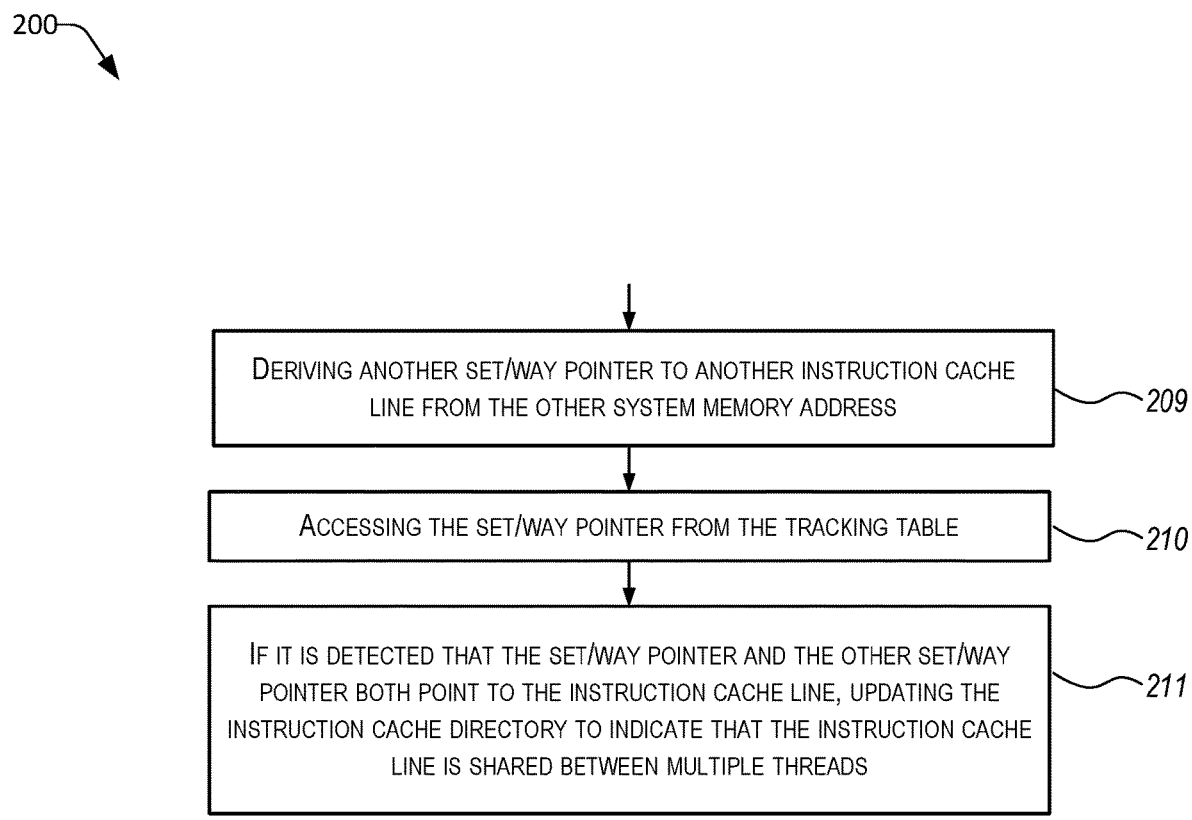

FIG. 2 illustrates a flow chart of an example method 200 for sharing instruction cache footprint between multiple threads, consistent with an illustrative embodiment. Method 200 will be described with respect to the components of computer architecture 100.

Method 200 includes receiving an instruction fetch from a first thread, the instruction fetch requesting an instruction from a system memory address (201). For example, cache manager 102 can receive instruction fetch 111A from thread 101A. Method 200 includes fetching the instruction from the system memory address (202). For example, cache manager 102 can fetch instruction 112 from an address in system memory 104.

Method 200 includes deriving a set/way pointer to an instruction cache line from the system memory address (203). For example, cache manager can derive L2xy 113A to cache line 108A from the address in system memory 104. Method 200 includes caching the instruction in the instruction cache line (204). For example, cache manager can cache instruction 112 in cache line 108A. Method 200 includes storing the set/way pointer as a surrogate for the system memory address in an instruction cache directory (205). For example, cache manger 102 can store L2xy 113A in IDir 106.

Method 200 includes receiving another instruction fetch from the second thread, the other instruction fetch requesting another instruction from another system memory address (206). For example, cache manager 102 can receive instruction fetch 111B associated with another system memory address in system memory 104. Method 200 includes determining that the other system memory address is a candidate for possible sharing (207). For example, cache manager 102 can determine that the memory address associated with instruction fetch 111B is a candidate for possible sharing.

Method 200 includes saving the set/way pointer from the instruction cache directory to a tracking table (208). For example, cache manager 102 can save L2xy 113A from IDir 106 to tracking table 107. Method 200 includes deriving another set/way pointer to another instruction cache line from the other system memory address (209). For example, cache manager 102 can derive L2xy 113B from the system memory address associated with instruction fetch 111B. Method 200 includes accessing the set/way pointer from the tracking table (210). For example, cache manager 102 can access L2xy 113A from tracking table 107.

Method 200 includes if it is detected that the set/way pointer and the other set/way pointer both point to the instruction cache line, then the instruction cache directory is updated to indicate that the instruction cache line is shared (211). For example, pointer comparator 103 can compare L2xy 113A and L2xy 113B. Based on the comparison, pointer comparator 130 can determine that L2xy 113A and L2xy 113B both point to instruction cache line 108A. In response, cache manager 102 can update 114 IDir 106 to indicate that instruction cache line 108A is shared between threads 101A and 101B. Indicating sharing of instruction cache line 108A can include changing a context tag in IDir 106 to indicate sharing.

Instruction cache line 108A can then be returned to either thread 101A or thread 101B in response to subsequent requests for instruction 112 from thread 101A or from thread 101B.

Similar operations can be implemented to determine that cache line 108A is shareable with one or more additional threads of processor 100. Instruction cache line 108A can then be returned to any of the one or more additional threads in response to subsequent requests for instruction 112 from any of the one or more additional threads.

In one aspect, cache manager 102 installs a tracking table entry into tracking table 107. Cache manager 102 can install a tracking table entry when there is an EA Dir miss/IDIR miss and other conditions are satisfied. Conditions can include:

1. The EA and MSR match.
2. The EADIR hit and way select was correct if used.
3. The sector valid is valid
4. There is no extraneous force miss condition.
5. The incumbent IDIR entry's context tag is a thread specific context tag or an 0xF context tag
6. The fetch's context tag is a thread specific context tag.
7. The thread valid from the IDIR does not include the current thread. The thread valids saved in the tracking table depend on whether or not the IDIR entry's context tag was already 0xF, or was a thread specific context tag.
    a. If the incumbent IDIR entry's context tag is 0xF, then the thread valid saved is the current idir thread valid or-ed with the current thread.

b. If the context tag is a thread specific context tag of 8, 9, A, B, then the thread valid is the or of the decode of the context tag bits (2:3) with the current thread. (This can cover cases where the LSU says the line cannot be shared between threads due to i.e. IAMR.) If these conditions match, it can be inferred that everything matched except for the context tag and is considered an "almost hit".

Tracking table 107 can include one entry per thread. Installing a new Tracking Table entry in tracking table 107 can include overwriting an existing entry. Tracking table 107 can be installed with the described information, saved from IDir 106 and EA Dir 131, along with the IDIR thread valids, for example, described in conditions 7a and 7b. In one embodiment, tracking table 107 can be used at reload.

A tracking table 107 entry can be viewed as a pointer to an entry in IDir 106. Thus, generally, any invalidate rules to IDir 106 can also be applied to entries in tracking table 107.

Figure 3:
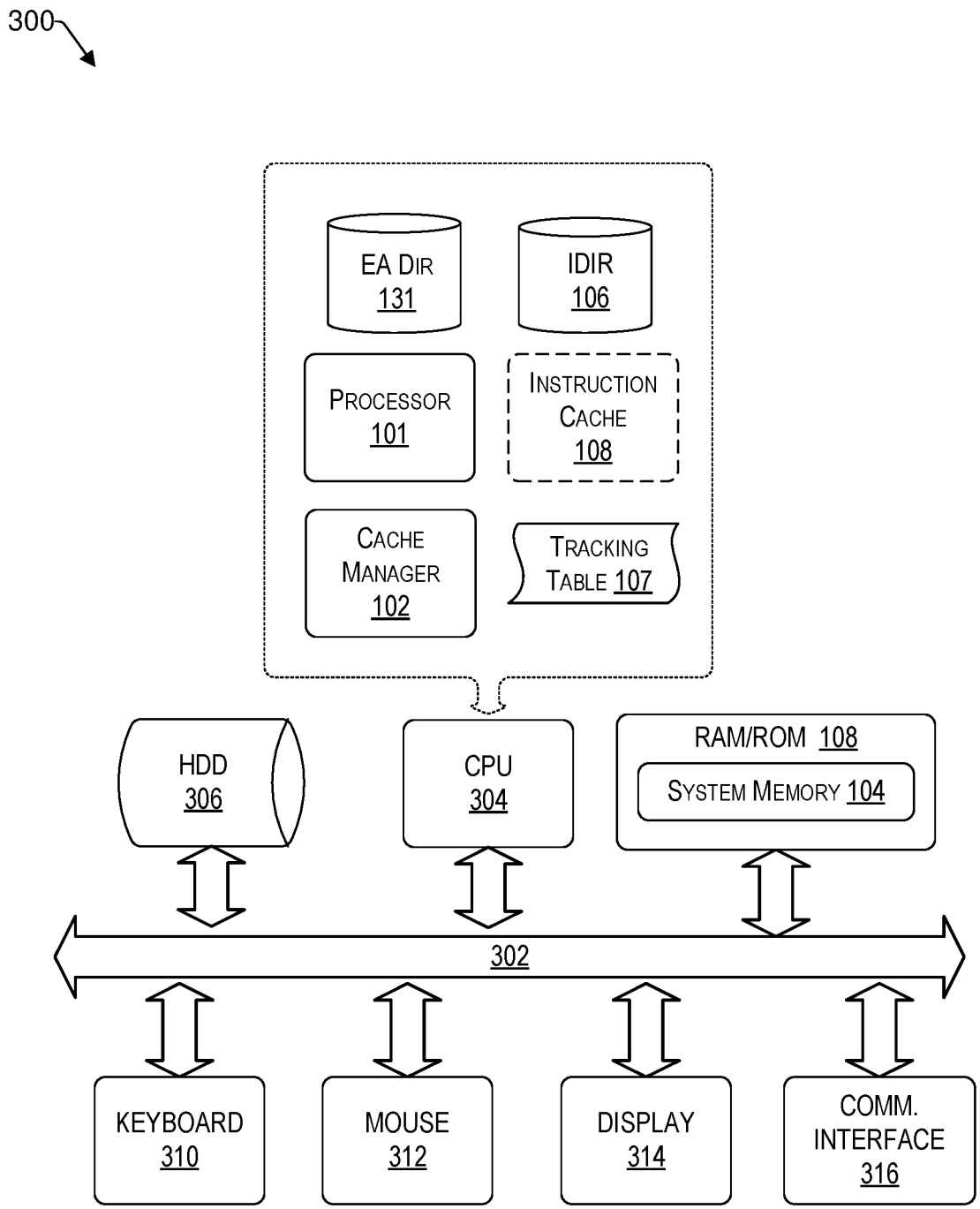
FIG. 3 illustrates a particularly configured computer hardware platform, consistent with an illustrative embodiment.

FIG. 3 illustrates a particularly configured computer hardware platform 300, consistent with an illustrative embodiment. Computer hardware platform 300 can be used to implement a computer system including the components of computer architecture 100.

Computer platform 300 may include a central processing unit (CPU) 304, a hard disk drive (HDD) 306, random access memory (RAM) and/or read only memory (ROM) 308, a keyboard 310, a mouse 312, a display 314, and a communication interface 316, which are connected to a system bus 302.

HDD 306 can include capabilities for storing programs that are executed.

CPU 304 can include capabilities for storing data and running programs internally. CPU 304 can include processor 101 (and corresponding threads), cache manager 102, IDir 106, tracking table 107, instruction cache 108, EA Dir 131, and a plurality of registers. Aspects of the present disclosure can be implemented inside CPU 304.

RAM/ROM 308 can include system memory 104.

Programs running inside CPU 304 can access data and instructions from system memory 104 via system bus 302. As appropriate, accessed data and instructions can be cached inside CPU 304. For example, accessed instructions can be cached in instruction cache 108.

Figure 4:
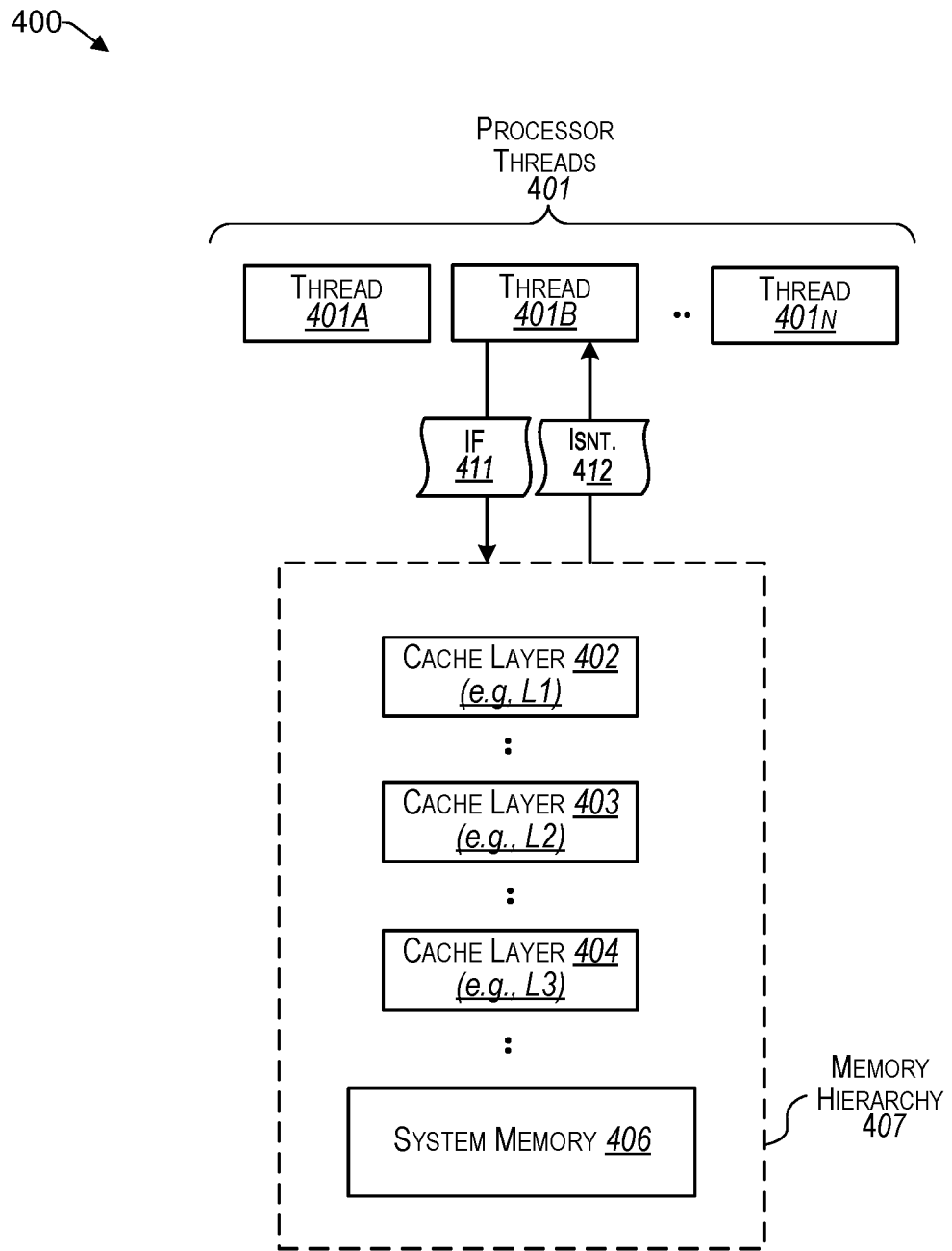
FIG. 4 illustrates an example memory architecture, consistent with an illustrative embodiment.

FIG. 4 illustrates an example memory architecture 400. Aspects of the present disclosure can be implemented in memory architecture 400 or other similar memory architectures. As depicted, memory architecture includes processor threads 401 and memory hierarchy 407. Processor threads 401 includes threads 401A, 401B, . . . , 401N. Memory hierarchy 407 includes cache layer 402 (e.g., L1), cache layer 403 (e.g., L2), cache layer 404 (e.g., L3) and system memory 406.

Within memory hierarchy 407, memory elements used to formulate cache layers closer to processor threads 401 can be faster than memory elements used to formulate layers further from processor threads 401. To balance cost, cache layers closer to processor threads 401 may also have less capacity than cache layers further from processor threads 401. For example, cache layer 402 can be faster than cache layer 403 but have less capacity than cache layer 403. System memory 406 can be slower than cache layers 402, 403, and 404 but have significantly more capacity than cache layers 402, 403, and 404.

Threads among processor threads 401 can submit instruction fetch requests to memory hierarchy requesting instructions. For example, thread 401B can submit instruction fetch 411 to memory hierarchy 407 requesting instruction 412. Cache layer 402 can be checked for instruction 412. If instruction 412 is cached in cache layer 402, instruction 412 can be returned from cache layer 402 to thread 401B.

If instruction 412 is not cached in cache layer 402, cache layer 403 can be checked for instruction 412. If instruction 412 is stored in cache layer 403, instruction 412 can be cached at cache layer 402 and returned to thread 401B.

If instruction 412 is not cached in cache layer 403, cache layer 404 can be checked for instruction 412. If instruction 412 is cached in cache layer 404, instruction 412 can be cached at cache layers 403 and 402 and returned to thread 401B.

If instruction 412 is not cached in cache layer 404, system memory 406 can be checked for instruction 412. If instruction 412 is stored in system memory 406, instruction 412 can be cached at cache layers 404, 403, and 402 and returned to thread 401B.

Instruction cache 108 can be implemented at any of cache layers 402, 403, or 404. In one aspect, instruction cache 108 is implemented at layer 402 (L1).

Example Operating Platform

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes SCM (and other intermediate storage solutions), RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium that can be used to store desired program code means in the form of computer-executable instructions or data structures and that can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: volume commands, volume metadata, queries, volume configurations, volume re-configurations, persistence loss notifications, persistence loss detections, etc.

System memory can be coupled to the one or more processors and can store instructions (e.g., computer-readable instructions, computer-executable instructions, etc.)

executed by the one or more processors. The system memory can also be configured to store any of a plurality of other types of data generated and/or transformed by the described components, such as, for example, volume commands, volume metadata, queries, volume configurations, volume re-configurations, persistence loss notifications, persistence loss detections, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for (re)configuring volumes at more volatile storage devices in response to a loss of persistence. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can include various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
 a multi-threaded processor including a plurality of processing threads having at least a first thread and a second thread;
 an instruction cache coupled to the multi-threaded processor and a system memory;
 a cache manager coupled to the instruction cache, wherein executing the cache manager configures the computing device to perform acts comprising:
 caching an instruction in a first instruction cache line of the instruction cache in accordance with a first instruction fetch and a first set/way pointer associated with a first address of the system memory;

storing the first set/way pointer as a surrogate for the first address of the system memory in an instruction cache directory;
saving the first set/way pointer from the instruction cache directory to a tracking table in response to a miss of another instruction fetch associated with another address of the system memory;
deriving another set/way pointer to another instruction cache line of the instruction cache from the other address of the system memory based on the other instruction fetch;
accessing the first set/way pointer from the tracking table in response to deriving the other set/way pointer; and
in response to detecting that the first set/way pointer accessed from the tracking table and the other set/way pointer both point to the first instruction cache line, updating the instruction cache directory to indicate that the first instruction cache line is shared between multiple threads.

2. The computing device of claim 1, further comprising:
receiving the first instruction fetch from the first thread, the first instruction fetch requesting the instruction from the first address of the system memory;
fetching the instruction from the first address of the system memory;
deriving the first set/way pointer to the instruction cache line from the first address of the system memory;
receiving the other instruction fetch from the second thread, the other instruction fetch requesting another instruction from another address of the system memory; and
determining that the first address of the system memory is a candidate for possible sharing.

3. The computing device of claim 1, further comprises detecting one or more of an instruction cache directory miss or an effective address directory miss prior to updating the instruction cache directory.

4. The computing device of claim 1, further comprising determining whether an effective address and model-specific register state associated with the first instruction fetch match the effective address and model-specific register state associated with the other instruction fetch prior to updating the instruction cache directory.

5. The computing device of claim 1, further comprising determining whether a context tag associated with the first instruction fetch does not match a context tag associated with the other instruction fetch.

6. The computing device of claim 1, wherein updating the instruction cache directory comprises changing a thread specific context tag value to a shared context tag value.

7. The computing device of claim 1, further comprising returning the first instruction cache line to the second thread in response to the other instruction fetch.

8. The computing device of claim 1, wherein the instruction cache is an N-way associative cache; and
wherein the multi-threaded processor includes three or more threads.

9. A computer-implemented method of sharing a first instruction cache line, the method comprising:
caching an instruction in the first instruction cache line of an instruction cache in accordance with a first instruction fetch and a first set/way pointer associated with a first address of the system memory;
storing the first set/way pointer as a surrogate for the first address of the system memory in an instruction cache directory;
saving the first set/way pointer from the instruction cache directory to a tracking table in response to a miss of another instruction fetch associated with another address of the system memory;
deriving another set/way pointer to another instruction cache line of the instruction cache from the other address of the system memory based on the other instruction fetch;
accessing the first set/way pointer from the tracking table in response to deriving the other set/way pointer; and
in response to detecting that the first set/way pointer accessed from the tracking table and the other set/way pointer both point to the first instruction cache line, updating the instruction cache directory to indicate that the first instruction cache line is shared between multiple threads.

10. The computer implemented method of claim 9, further comprising:
receiving the first instruction fetch from a first thread, the first instruction fetch requesting the instruction from the first address of the system memory;
fetching the instruction from the first address of the system memory;
deriving the first set/way pointer to the first instruction cache line from the first address of the system memory;
receiving the other instruction fetch from the second thread, the other instruction fetch requesting another instruction from another address of the system memory; and
determining that the first address of the system memory is a candidate for possible sharing.

11. The computer implemented method of claim 9, further comprising detecting one or more of an instruction cache directory miss or an effective address directory miss prior to updating the instruction cache directory.

12. The computer implemented method of claim 9, further comprising determining that an effective address and model-specific register state associated with the first instruction fetch match the effective address and model-specific register state associated with the other instruction fetch, prior to updating the instruction cache directory.

13. The computer implemented method of claim 9, further comprising determining that a context tag associated with the first instruction fetch does not match a context tag associated with the other instruction fetch.

14. The computer implemented method of claim 9, wherein updating the instruction cache directory comprises changing a thread specific context tag value to a shared context tag value.

15. The computer implemented method of claim 9, further comprising returning the first instruction cache line to the second thread in response to the other instruction fetch.

16. The computer implemented method of claim 9, wherein caching the instruction in the first instruction cache line comprises caching the instruction in an instruction cache line of an N-way associative cache.

17. A non-transitory computer readable storage medium tangibly embodying a computer readable program code having computer readable instructions that, when executed, causes a cache manager to carry out a method of sharing a first instruction cache line, the method comprising:
caching an instruction in the first instruction cache line of an instruction cache in accordance with a first instruction fetch and a first set/way pointer associated with a first address of the system memory;

storing the first set/way pointer as a surrogate for the first address of the system memory in an instruction cache directory;

saving the first set/way pointer from the instruction cache directory to a tracking table in response to a miss of another instruction fetch associated with another address of the system memory;

deriving another set/way pointer to another instruction cache line of the instruction cache from the other address of the system memory based on the other instruction fetch;

accessing the first set/way pointer from the tracking table in response to deriving the other set/way pointer; and in response to detecting that the first set/way pointer accessed from the tracking table and the other set/way pointer both point to the first instruction cache line, updating the instruction cache directory to indicate that the first instruction cache line is shared between multiple threads.

18. The non-transitory computer readable storage medium of claim 17, further comprising:

receiving the first instruction fetch from a first thread, the first instruction fetch requesting the instruction from the first address of the system memory;

fetching the instruction from the first address of the system memory;

deriving the first set/way pointer to the first instruction cache line from the first address of the system memory;

receiving the other instruction fetch from the second thread, the other instruction fetch requesting another instruction from another address of the system memory; and determining that the first address of the system memory is candidate for possible sharing.

19. The non-transitory computer readable storage medium of claim 17, further comprising detecting one or more of an instruction cache directory miss or an effective address direction miss prior to updating the instruction cache directory.

20. The non-transitory computer readable storage medium of claim 17, further comprising determining that a context tag associated with the first instruction fetch does not match a context tag associated with the other instruction fetch.

* * * * *